July 16, 1963 R. A. WILKINS 3,097,965

CONDUCTIVE WIRE COATING ALLOYS, WIRES COATED THEREWITH
AND PROCESS FOR IMPROVING SOLDERABILITY THEREFOR

Filed July 27, 1961

INVENTOR.
RICHARD A. WILKINS
BY
Emery, Booth, Miller & Townsend
ATTORNEYS

United States Patent Office 3,097,965

Patented July 16, 1963

3,097,965

CONDUCTIVE WIRE COATING ALLOYS, WIRES COATED THEREWITH AND PROCESS FOR IMPROVING SOLDERABILITY THEREFOR

Richard A. Wilkins, R.D. 2, Hinman Road, Trenton, N.Y.

Filed June 27, 1961, Ser. No. 127,295
4 Claims. (Cl. 117—231)

My present invention relates to metallic electrical conductors, especially copper and copper base wires and the like, and to the processing of the same for the improvement of electrical connection thereof as by soldering, particularly for electrical and electronic uses in which the conductor in the process of being coated with insulating material is to be subjected to relatively high temperatures of the order of about 300° F. or more.

More particularly the invention comprises the discovery of new and improved coating alloys for such conductors and of the resultant coated electrical conductor products themselves together with the manner of producing the same for improving the soldering properties and especially with respect to the lessening of heretofore objectionable changes such as discoloration or tarnishing when the coated conductors are to be subjected to insulating or other processing operations performed at temperatures up to and in excess of 300° F. or thereabouts.

Figure 1:
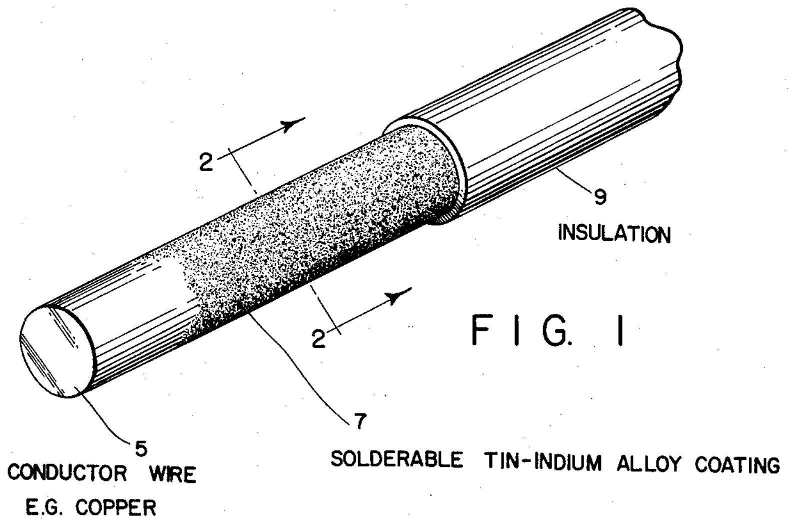
Figure 2:
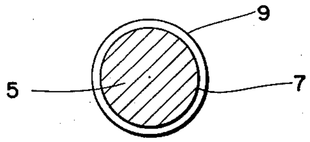

These and other advantages of the invention will be apparent from the following description in connection with the accompanying drawing, in which:

FIG. 1 shows diagrammatically and not to scale a short length of an insulated or partially insulated electrical conductor element or wire illustrative of the invention; and FIG. 2 is a section as on the line 2—2 of FIG. 1.

In the area of flexible and other metallic electrical conductors, for which the term "wire" is herein used broadly for conductor elements of electrical and electronic circuitry, it is well known to coat the wire with tin as an aid to making soldered connections. Thus for example tin-coated copper and copper base electrical conductor wire is a standard article of manufacture.

Such tin-coated copper wire has been generally satisfactory where insulation thereof is not needed or where insulation or partial insulation may be applied in a manner, such as winding or braiding with textile or other strands or low-temperature extrusion of rubberous covering material about it, which does not involve subjection of the tin-coated wire to temperatures much above ordinary ambient room temperatures or to more than about 200° to 250° F. for ordinary "cool" insulative covering.

But in other processes of insulating tin-coated conductor wire, especially for certain electronic circuitry uses thereof, subjection of the wire to substantially elevated temperatures is characteristic of the processing, meaning thereby temperatures substantially above 250° F. and ranging from somewhat below or about 300° F. and upward to temperatures considerably in excess of said latter value. Other processing treatments than those aimed primarily at insulation may also subject the tin-coated wire to the relatively high temperatures of the order above stated.

In the presence of such high-temperature insulating and and other processing methods, or any preparatory treatment conducted at temperatures around and in excess of 300° F. it is found that the customary tin-coating of the conductor wire, particularly copper and copper base wire, is deleteriously affected, becomes discolored or tranished, apparently under some oxidizing action, and reduces the ability or readiness thereof to accept soldering as for forming electrical and electronic circuitry connections.

The above-stated diffculties heretofore resultant where tin-coated wire has been subjected to heating at the relatively high temperatures stated are largely obviated in accordance with my present invention. The characterizing feature thereof is my discovery that by alloying certain small percentages of the metal indium and preferably also a minor quantity of copper with tin to form a wire-coating alloy, and by coating conductor wire, especially copper and copper base wire with such alloy, the resulting novelly alloy-coated wire is enabled to withstand insulating and other processing operations performed at temperatures up to and in excess of 300° F. without discoloring or tarnishing and possesses excellent facility to accept soldering connecting.

The wire-coating alloy of the invention, in a presently preferred example, has the following composition: indium in the small proportion of 0.01% up to about 1.0%, copper in the amount of 1.0% to 7.0%, and the balance tin, i.e. about 92% to 98.9% of the whole by weight, except for the presence of minor impurities. Thus, for example, metals of the group comprising silver, zinc and cadmium in minute or fractional percentage quantities are found to have no substantially adverse or deleterious effect in coatings of the alloy upon copper and copper base wires and consequently may be present in such minimal quantities.

In the here disclosed alloy, as in the above-stated preferred example, the indium in association with the tin results in according thereto the capacity when employed as a conductor coating, especially on copper and copper base wires, of resisting yellowing and other discoloring, tarnishing or other deterioration or deleterious modification tending to make it unsatisfactory for soldering for electrical connection, despite subjection of the so coated conductor to heating at the relatively high temperatures above stated, and whereby the conductor coating remains bright and readily solderable after such heating in any further processing thereof.

While in the stated preferred example the described tin-base alloy is tertiary, comprising in addition to the 0.01% to 1.0% of indium a quantity of copper in the small range of about 1.0% to 7.0%, satisfactory results of the character stated have been obtained by the use of the binary tin-indium alloy of the stated relative percentages and without the presence of copper. The inclusion of the copper however is found beneficial to the wire-coating use of the alloy. It appears that it helps to raise the melting point of the alloy thereby reducing flow tendency of the coating at temperatures of the order here concerned, namely 300° F. and above and so promoting the capability of receiving soldered electrical connection.

It is further noted that the small proportionate quantity of the relatively expensive indium and the unexpectedly narrow range therefore of but about 0.01% to 1.0% of the whole is found to be substantially critical, in that indium in amounts below the stated quantity range fails to prevent heat deterioration of the alloy when employed as a wire coating while in amounts to any appreciable extent above the stated indium quantity range the molten metal bath tends to dross heavily, with the result that there is an excessive loss of indium and the quality of the product deteriorates because of the adherence of small particles of dross which cause roughening of the wire.

In the accompanying diagrammatic elevational and cross-sectional views, FIGS. 1 and 2, not to scale, a short length of conductor wire is shown as illustrative of the wire-coating alloy and of an example of an alloy-coated and insulated or partly insulated conductor wire which in an after-coating processing operation, such as the application of such insulation, has been subject to heat at a temperature of 300° F. or more. The metallic conductor wire is indicated at 5 and in this example is assumed to be of copper or a copper base composition. The herein disclosed alloy and the coating composed thereof is represented at 7 and may be considered as either the binary or the tertiary form thereof as earlier herein disclosed. The covering 9 surrounding the coated wire or a portion or portions thereof is intended as representative of any desired insulating or other surrounding layer, continuous or otherwise, the application, finishing or other treatment of which or of the encompassed alloy-coated wire 5, 7 involves the presence of temperatures in the elevated range as herein stated. As further indicated by the legend adjacent the subject alloy and the coating formed thereof, the same is represented in the resultant non-deteriorated and connectively solderable status which is characteristic of the herein disclosed invention.

Along with the here disclosed wire-coating tin-base alloy and the conductor wire products coated therewith the invention importantly comprises the process or method for improving the soldering properties of tin-coated copper, copper base and other electrical conductor wire for which insulating or other treatment requires that it be subjected to heat at temperatures up to and in excess of 300° F., which process includes the steps of preparing coating alloys consisting essentially of tin in quantity up to 92% to 98.9%, indium in the low proportion of 0.01% to 1.0% and with or without copper in the proportion of 1.0% to 7.0%, and coating such alloy onto the metal wire core or body prior to insulation, partial insulation or other finishing treatment thereof that is conducted under temperature conditions at the wire of the order of about 300° F. or more.

My invention as to the alloy, the alloy coated wire products and the process therefor is not limited to the exemplary embodiments and steps as herein illustrated or described, its scope being more fully set forth in the following claims.

I claim:

1. A coated copper or copper-base-composition conductor wire possessing superior solderability and reduced susceptibility to deterioration under insulative processing heating and wherein the coating of the wire is a tin-base alloy consisting of 0.01% to 1.0% indium, from 1% to 7% of copper, and the balance tin substantially free of impurities save for permissible fractional percentage quantities of metals of the group comprising silver, zinc and cadmium.

2. An electrically insulated electrical conductor wire comprising a core wire of copper coated with an alloy consisting of copper in the amount of 1.0% to 7.0%, indium in the amount of 0.01% to 1.0% and the balance tin, and an electrical insulative cover over said coating and which cover in the course of application thereof has been subjected to heat at a temperature of at least about 300° F.

3. For use in the coating of copper and copper-base-composition electrical conductor wire, a tin-base alloy consisting of 0.01% to 1.0% indium, from about 1.0% to about 7.0% copper, and the balance tin substantially free of impurities save for permissible fractional percentage quantities of metals of the group comprising silver, zinc and cadmium.

4. The method for improving the soldering properties for electrical connection purposes of tin-coated copper and copper base electrical conductor wire which is likely to be subjected to temperatures up to and in excess of 300° F. in the subsequent handling thereof, which method comprises the steps of preparing and supplying a coating alloy consisting of indium in the small proportion of 0.01% to 1.0%, copper in the amount of 1.0% to 7.0%, and the balance essentially tin, and coating such alloy onto the bare metal wire body for rendering it capable of retention of good soldering properties and of freedom from discoloration and other deterioration despite subsequent subjection of the alloy-coated wire to temperature conditions thereat up to and in excess of 300° F.

References Cited in the file of this patent

UNITED STATES PATENTS

| | | |
|---|---|---|
| 2,047,029 | Muller | July 7, 1936 |
| 2,700,623 | Hall | Jan. 25, 1955 |
| 2,842,440 | Nachtman et al. | July 8, 1958 |
| 2,876,139 | Flowers | Mar. 3, 1959 |

FOREIGN PATENTS

| | | |
|---|---|---|
| 666,392 | Great Britain | Feb. 13, 1952 |